United States Patent [19]

Miki et al.

[11] Patent Number: 4,520,541
[45] Date of Patent: Jun. 4, 1985

[54] METHOD FOR PRODUCING PROFILED PRODUCT HAVING FINS

[75] Inventors: Isao Miki; Toshiyuki Kawai, both of Shimizu, Japan

[73] Assignee: Nippon Light Metal Co., Ltd., Tokyo, Japan

[21] Appl. No.: 331,177

[22] Filed: Dec. 16, 1981

[30] Foreign Application Priority Data

Dec. 19, 1980 [JP] Japan ............................. 55-178992
Apr. 13, 1981 [JP] Japan ............................. 56-55287

[51] Int. Cl.³ ............................................. B23P 15/02
[52] U.S. Cl. ........................ 29/156.8 CF; 29/156.8 R; 29/23.5; 72/324; 416/183
[58] Field of Search ............... 29/156.8 CF, 156.8 B, 29/156.8 R, 23.5; 72/377, 324; 416/183, 185

[56] References Cited

U.S. PATENT DOCUMENTS

| | | | |
|---|---|---|---|
| 2,467,344 | 4/1949 | Taylor | 29/156.8 B |
| 2,962,941 | 12/1960 | Stein et al. | 416/183 |
| 2,965,287 | 12/1960 | Schug | 29/156.8 CF |
| 3,226,967 | 1/1966 | Paille et al. | 29/156.8 B |
| 3,481,531 | 12/1969 | MacArthur et al. | 416/183 |
| 3,536,417 | 10/1970 | Stiefel et al. | 416/183 |

FOREIGN PATENT DOCUMENTS 587514 4/1947 United Kingdom ............... 416/184

Primary Examiner—Daniel C. Crane
Attorney, Agent, or Firm—McAulay, Fields, Fisher, Goldstein & Nissen

[57] ABSTRACT

Disclosed is a method of producing a profiled product having fins such as an impeller having vanes which cannot be formed directly by casting a preliminary product having fins of the desired shape, a concave filled out portion being provided at one side of the root of each fin along the length of each fin depending upon the required final shape of the fin, while a corresponding cut out portion is formed at the opposite side of the root of each fin at the position corresponding to the above filled out portion, and then applying a force to each fin so as to cause plastic deformation thereof at the position where the concave filled out and cut out portions are provided thereby permitting the location of the root of each fin to be displaced toward the side provided with the filled out portion by the amount corresponding to the variation in the amount of the filled out and cut out portions to form the required final shape of each fin. Alternatively, concave filled out portions may be provided at both sides of the root of each fin.

10 Claims, 18 Drawing Figures

METHOD FOR PRODUCING PROFILED PRODUCT HAVING FINS

BACKGROUND OF THE INVENTION

The present invention relates to a method of producing a profiled product having fins such as an impeller or a runner for use in a centrifugal compressor, a radial turbine and the like.

The impeller of the type described above is in general constituted by a back shroud and a plurality of vanes fixedly secured to or integral with the shroud and extending substantially linearly radially from the rotary axis of the shroud or extending outwardly from the rotary axis in curved form toward the direction of rotation or in the opposite direction. Further, an inducer and an exducer are often provided at the inlet end and the outlet end of each vane, respectively, by appropriately bending the same so as to obtain required inflow and outflow angles at the respective ends.

As a method of producing an impeller as described above, a method by which vanes are formed by machining or cutting a material for forming vanes integral with the shroud, a method by which vanes produced separately from the shroud are fixedly secured thereto, forging method and casting method were known.

Since vanes of an impeller are, however, formed in various configurations as described above, the possibility exists that a die casting method using a split-type mould can not be adopted for producing an impeller when the configuration of vanes constitutes so called undercuts. In such a case, a plaster mould, a sand mould, a lost-wax mould or the like having collapsible cores must be used in general. A casting method using such a mould has disadvantages in that the workability and the productivity are very low in comparison with the die casting method. The cost is high, while the dimensional accuracy and the surface quality of the product are low.

SUMMARY OF THE INVENTION

It is therefore an object of the present invention to provide a novel and useful method by combining casting and plastic deformation processes for producing profiled products having fins with undercuts such as impellers having vanes of various configurations impossible to be formed directly by the casting process without collapsible cores.

The above object is achieved in accordance with the characteristic feature of the present invention by providing a method of comprising the steps of first producing a preliminary product having fins in the form capable of being formed by a casting process including die casting, gravity casting and low pressure casting without collapsible cores and squeeze casting, one side of the root of each fin being formed with a concave filled out portion varying its size or amount along the length of the fin depending upon the required final configuration of the fin, while a corresponding cut out portion is formed at the opposite side of the root at the corresponding position, and applying a force to each fin so as to cause plastic deformation at the portion of the fin where the concave filled out portion and the corresponding cut out portion are formed thereby permitting the location of the root of each fin at the above described portions to be displaced toward the side provided with the concave filled out portion by the amount corresponding to the variation in the size or amount of the concave filled out portion and the corresponding cut out portion along the length of the fin so that the required final configuration of each fin is obtained.

With the method described above, since one side of the root of each fin has a concave filled out portion of the required amount at the required position and the corresponding cut out portion is formed at the opposite side of the root at the corresponding position, the location of the root of each fin at the position where the concave filled out portion and the corresponding cut out portion are formed is displaced toward the side provided with the concave filled out portion after a force of plastic deformation of the fin is applied thereto so as to deform the concave form of the filled out portion into a straight form extending in the direction in which the force is applied to the fin, and the cut out portion at the opposite side assists the displacement of the location of the root of the fin where the concave filled out portion had been provided and it is also deformed into a straight form parallel to the straight form obtained by the deformation of the filled out portion. Thus, the entire configuration of the respective fins is rendered to assume the required configuration depending upon the amount of the concave filled out portion and the cut out portion.

In accordance with another feature of the present invention, each fin is located in an inclined position with respect to the surface of the preliminary shape to which the root of each fin is integrally joined by casting without collapsible cores and a concave filled out portion is provided at each side of the root of each fin varying its width as measured on the surface of the preliminary shape along the length of the fin depending upon the required configuration of the fin, the concave filled out portion formed at one side of the root which forms an acute angle with respect to the surface of the preliminary shape being deepened inwardly therein with respect to the concave filled out portion at the opposite side of the root; the above described deepened filled out portion is joined to the filled out portion at the opposing side of the root of the adjacent fin by the gently curved surface, and a force is applied to each fin through descending press die so as to cause plastic deformation of the fin for pushing up on same into the upright position thereby permitting the root of each fin to be deformed and displaced on the surface of the preliminary shape by an amount determined by the variation in width of the concave filled out portion so as to form the required final curved form of each fin having a rounded concave surfaces formed at both sides of the root thereof to thereby enhance strength of the fins.

The present invention is mainly directed to the manufacture of an impeller having curved vanes impossible to be directly formed by casting without collapsible cores from aluminum alloy. It is in general thought that elongation or bending of a die cast product of aluminum alloy is difficult.

However, such elongation or bending of a die cast product of aluminum alloy is possible by using an Al-Si-Fe-Mg-Mn alloy as disclosed in Japanese Patent Public Disclosure No. 86011/1976 filed by K.K. Nippon Light Metal Research Institute, a subsidiary of the Assignee of this application, and marketed under the trade name "DX30 alloy" or an Al-Si-Fe-Cu-Mg-Mn alloy made by adding 0.5–1.5 Wt% Cu to the above alloy and marketed under the trade names "DX31 alloy" and "DX 32 alloy", or an Al-Mg-Zn alloy disclosed in Japanese Patent Publication No. 32808/1970 also filed by the above described subsidiary of the Assignee of this application and marketed under the trade name "CX2A alloy". Products made of such alloys can be subjected to sufficient heat treatment so that it was proven that the present invention can be carried out by using the above described alloys.

BRIEF DESCRIPTION OF THE DRAWINGS

The present invention will be described hereinbelow with reference to the accompanying drawings illustrating the preferred embodiments of the present invention, in which.

DETAILED DESCRIPTION OF THE PREFERRED EMBODIMENT

Figure 1:
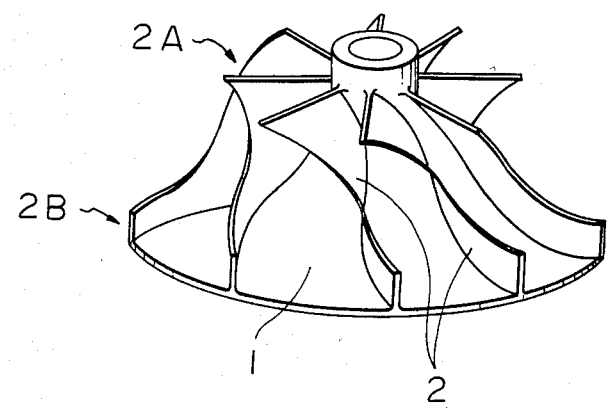
FIG. 1 is a perspective view showing an impeller having fins produced in accordance with the present invention.

FIG. 1 shows an impeller having a back shroud 1 and a plurality of curved vanes 2 integral with the shroud 1 produced by the method of the present invention, the vanes 2 having a curved shape impossible to be formed directly by the casting without collapsible cores. As shown in FIG. 1, each vane 2 has inducer 2A at its inlet end and exducer 2B at its outlet end for defining appropriate inflow and outflow angles.

Figure 2:
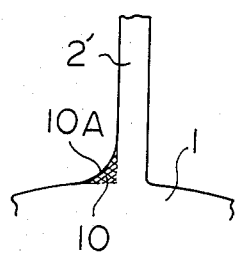
FIGS. 2-4 are schematic diagrams showing the steps of the method of the present invention is sequence.
Figure 3:
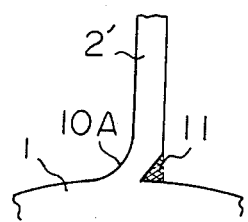
Figure 4:
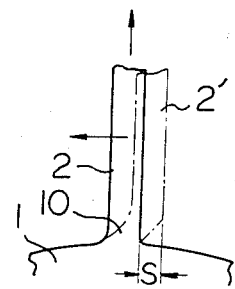

Referring now to FIGS. 2-4, each vane 2' of the impeller as originally formed by casting is provided with a rounded filled out portion 10 having a concave surface 10A at one side of the root of the vane 2 joined to the surface of the shroud 1 as shown in FIG. 2.

A cut out or recessed portion 11 is formed at the other side of the root corresponding to the filled out portion 10 at the same time or after the formation of the latter as shown in FIG. 3. The amount or the size of the filled out portion 10 and the corresponding cut out portion 11 is varied along the radial length of the vane 2' in a predetermined manner depending upon the final configuration of the vane 2. The thickness between the surface 10A and the inclined surface of the cut out portion is made to the thickness required for the vane 2.

Then, a force is applied to each vane 2' so as to cause plastic deformation of the same so that the vane 2' is deformed as indicated by the vertical arrow in FIG. 4 so that the vane 2' shown by the dashed line is deformed upright to form the final shape of the vane 2 as shown by the solid line while vane 2 is shifted or displaced to the left as shown by the horizontal arrow.

Since the distance S of the horizontal displacement of the vane 2 is a function of the amount of the filled out portion 10 and the recessed portion 11 which vary along the radial length of a vane in the predetermined manner, the desired final shape of the vane 2 is obtained by appropriately selecting the amount of the filled out portion 10 and the recessed portion 11 along the radial length of the vane.

Figure 5:
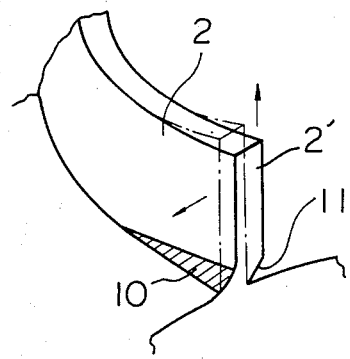
FIG. 5 is a perspective view showing the sequential variation in configuration of the fin of an impeller as effected by the steps of the method shown in FIGS. 2-4.

At the same time, the vane 2 is moved as shown by the dashed line in FIG. 5 in comparison with the original shape as shown by the solid line.

Figure 6:
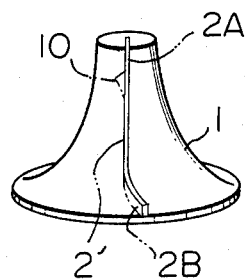
FIGS. 6-8 are perspective views showing the sequential deformation of the fin of an impeller effected by the steps of the present invention.
Figure 7:
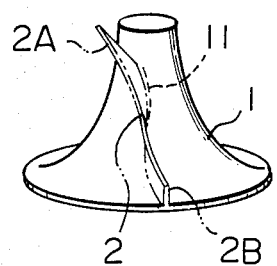
Figure 8:
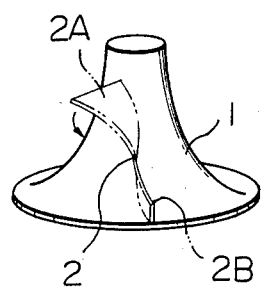

FIGS. 6-8 show the steps of forming the final shape of the vanes 2 of which only one vane 2 is illustrated for the sake of simplicity. FIG. 6 shows the original form of the vane 2' as obtained by casting without collapsible cores, wherein only the exducer 2B is curved and the filled out portion 10 and the corresponding recessed portion (not shown) are formed in the upper portion near the inducer 2A.

After application of force to the vane 2' in the direction of the height thereof, the vane assumes the shape as shown in FIG. 7 wherein the upper portion of the vane near the inducer 2A is displaced to the left so as to form a curved vane by providing the filled out portion 10 and the recessed portion 11 of the required amount.

Then, the upper portion near the inducer 2A is bent into the desired form so as to achieve the desired inflow angle of the inducer 2A as shown in FIG. 8.

Figure 9:
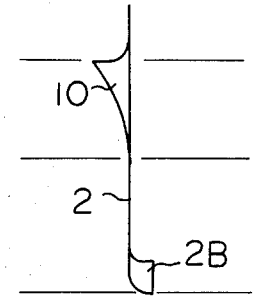
FIGS. 9-11 are schematic diagrams showing sequential deformation of the vane of the impeller shown in FIGS. 6-8 as seen from the top of the vane.
Figure 10:
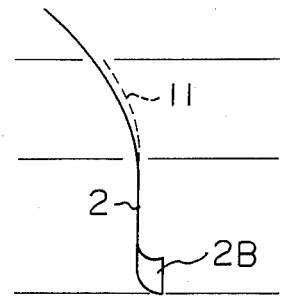
Figure 11:
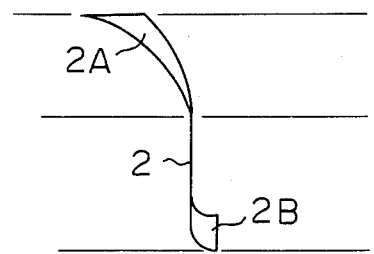

FIGS. 9-11 also show schematically the steps of forming the final shape of the vane shown in FIGS. 6-8.

Figure 12:
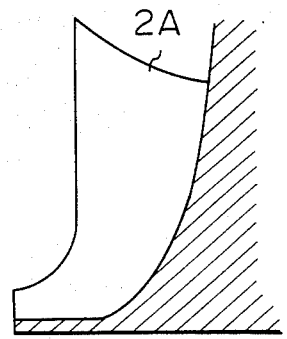
FIGS. 12-14 are cross-sectional views corresponding to FIGS. 6-8, respectively.
Figure 13:
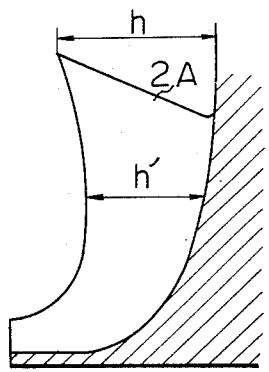
Figure 14:
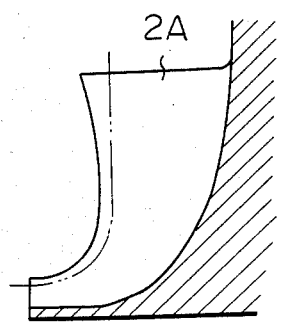

FIGS. 12-14 show the shape of the vane in each step of forming the final shape starting with the original shape obtained by the casting shown in FIGS. 6-8.

Appropriate heat treatment is effected before and after the application of force and bending to the preliminary product formed by casting so as to facilitate working and enhance strength.

Preferable heat treatment is as follows: The preliminary shape is first subjected to a fluidization process at the temperature of about 480°–530° C. and to a quenching process, then, the thus treated product is subjected to hot bending and, thereafter, to age hardening at the temperature of about 140°–200° C. The above described heat treatment serves to make it easy to effect bending and elongation of the vane while the mechanical strength of the product is enhanced.

Figure 15:
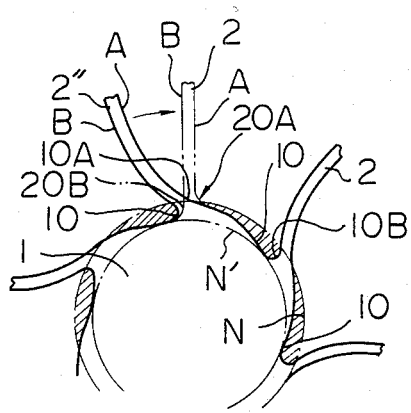
FIG. 15 is a cross-sectional view showing the feature of the modified method of the present invention for producing an impeller as an example.

FIG. 15 shows the modified method of the present invention for producing an impeller as an example similar to that shown in FIG. 1 except that concave filled out portions are formed at both sides of the root of each vane so that the strength of the vane is enhanced.

As shown in FIG. 15, each vane 2" is originally formed by casting in an inclined state with respect to the surface of the shroud 1, wherein the root of the side of the vane forming an acute angle between it and the surface of the shroud 1 is joined to the surface of the shroud 1 through a concave surface 10B tangential with a circle N' having a smaller diameter than that of the circle N defining the reference surface of the shroud 1 while the root of the opposite side of each vane 2" is joined to the surface of the shroud 1 through a concave surface 10A of a relatively large radius of curvature substantially tangential with the circle N. Thus, the concave surface 10B is recessed or deepened in comparison with the concave surface 10A.

As shown in FIG. 15, the concave surface 10B of one vane is joined to the concave surface 10A of the adjacent vane through a gently curved surface.

Figure 16:
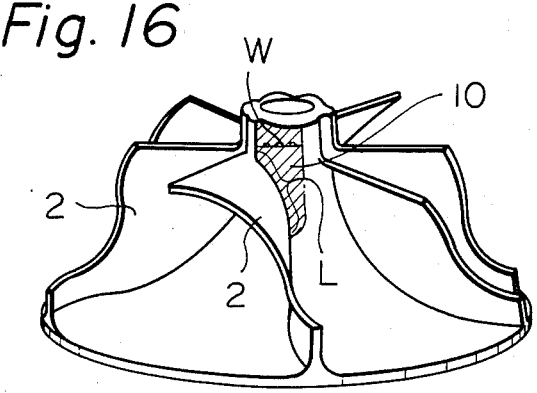
FIG. 16 is a perspective view showing an impeller produced by the modified method of the present invention.
Figure 17:
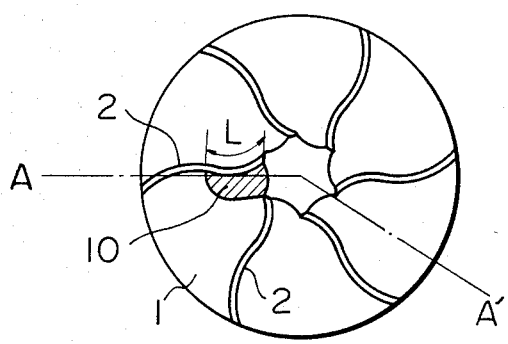
FIG. 17 is a plan view of FIG. 16.
Figure 18:
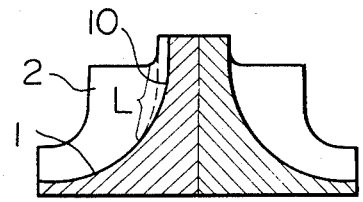
FIG. 18 is a longitudinal sectional view of FIG. 17 along line A—A' shown therein.

The width W (FIG. 16) of the concave surfaces 10A and 10B are varied along the length L of the vane depending upon the desired displacement of the root of the vane in like manner as in the previously described method.

Then, after appropriate heat treatment is effected, each vane 2" is deformed to the upright position as shown in FIG. 15 by applying a force in the radial or outward direction to the vane 2" so that the final form of the vane 2 is obtained, wherein the location of the root of the vane 2 is circumferentially shifted or displaced by the amount corresponding to the size or amount of the concave surfaces 10B and 10A which varies along the length of the vane depending upon the desired configuration of the vane, while concave surfaces 20A, 20B of the appropriate size are formed at the respective sides of the root of each vane.

Thereafter, appropriate heat treatment is effected so as to enhance the strength of the vane.

Thus, an impeller having vanes of the desired configuration is obtained in accordance with the modified method of the present invention as described above, wherein concave surfaces are formed at both sides of the root of each vane.

The impeller produced by the method of the present invention has a superior internal structure in comparison with the conventional casting using a sand mould and a plaster mould. The weight balance, which is very important for an impeller rotating at a very high speed, is superior. Since the bending is used in addition to the extrusion casting, a product having a very high dimensional accuracy can be obtained by the method of the present invention in comparison with other processes such as casting with assembled collapsible cores.

What is claimed is:

1. Method for producing a profiled product with fins such as impellers having twisted vanes not formable directly by casting without collapsible cores, comprising the steps of first casting a preliminary shape, said shape having roots and elongated fins in such a form that they can be shaped by a casting process, one side of said root of each fin being formed with a concave filled out portion varying in size or amount along the length of the fin depending upon the final configuration thereof, while a corresponding cut out portion is formed at the opposite side of said root at a position corresponding to said concave filled out portion, and applying a laterally offsetting force relative to the fin to force each fin radially outwardly from said shape so as to cause plastic deformation at the portion of the fin where said concave filled out and corresponding cut out portions are provided to provide a lateral offsetting of the fin to the side toward the concave filled out portion thereby permitting the position of the root of each fin at said portions to be displaced toward the side provided with said concave filled out portion by an amount corresponding to the variation in the size of said concave filled out and cut out portions to form the final shape of each fin.

2. Method as set forth in claim 1, wherein said cut out portion is formed simultaneously with said concave filled out portion.

3. Method as set forth in claim 1, wherein said cut out portion is formed after said preliminary product if produced by the casting.

4. Method as set forth in claim 1, wherein appropriate heat treatment is applied to the preliminary product before and after the formation of the final shape of each fin.

5. Method as set forth in claim 2, wherein an appropriate heat treatment is applied to the preliminary product before and after the formation of the final shape of each fin.

6. Method as set forth in claim 3, wherein an appropriate heat treatment is applied to the preliminary product before and after the formation of the final shape of each fin.

7. The method of claim 1 wherein said casting process is a die casting, a gravity casting or a low pressure casting or a squeeze casting process.

8. Method for producing a profiled product having fins such as an impeller having twisted vanes impossible to be formed directly by casting without collapsible cores, comprising the steps of first casting a preliminary shape, said shape having roots and elongated fins in such a form that they can be shaped by a casting process, each fin being located in an inclined state with respect to the surface of said shape such that one side of the fin is at an acute angle relative to the shape surface, a concave filled out portion being provided at each side of the root of each fin varying in width as measured on the surface of said preliminary shape along the length of the fin depending upon the required configuration thereof, the concave filled out portion formed at one side of the root which forms an acute angle with respect to the surface of said preliminary product being deepened inwardly therein with respect to the concave filled out portion at the opposite side of the root, the concave filled out portion of each fin being joined by a gently curved surface to the opposing filled out portion of the adjacent fin and applying a laterally offsetting force relative to the fin to force each fin radially outwardly from said shape so as to cause plastic deformation at the position where said concave filled out portions are provided for pushing up the same into the upright position thereby permitting the root of each fin to be deformed and displacing its location on the surface of said shape by the amount determined by the variation in width of said concave filled out portion to form the final shape of each fin; said fin having concave filled out portions at both sides of the root thereof and said fin being laterally offset towards the side of the concave filled out portion at the opposite side of the root.

9. Method as set forth in claim 8, wherein appropriate heat treatment is applied to the preliminary product before and after the formation of the final shape of each fin.

10. The method of claim 8 wherein said casting process is die casting, gravity casting, low pressure casting or squeeze casting.

* * * * *